United States Patent [19]
Shinohara et al.

[11] Patent Number: 5,128,428
[45] Date of Patent: Jul. 7, 1992

[54] CURABLE RESIN COMPOSITION

[75] Inventors: Norio Shinohara, Isesaki; Kazuo Ohtani, Kumagaya; Toshiaki Hanyuda, Yokohama, all of Japan

[73] Assignee: Showa Highpolymer Co., Ltd., Tokyo, Japan

[21] Appl. No.: 680,364

[22] Filed: Apr. 4, 1991

[30] Foreign Application Priority Data

Apr. 9, 1990 [JP] Japan .................................. 2-92346
Oct. 29, 1990 [JP] Japan ................................. 2-288496

[51] Int. Cl.$^5$ ............................................ C08F 22/40
[52] U.S. Cl. ..................................... 526/262; 526/310
[58] Field of Search ............................... 526/262, 310

[56] References Cited

U.S. PATENT DOCUMENTS 4,812,511  3/1989  Domeier ............................. 526/262

FOREIGN PATENT DOCUMENTS 62-053319  3/1987  Japan .
10065110  3/1987  Japan .

Primary Examiner—Joseph L. Schofer
Assistant Examiner—Alex H. Walker
Attorney, Agent, or Firm—Oblon, Spivak, McClelland, Maier & Neustadt

[57] ABSTRACT

Curable resin composition comprising a compound (A) having one or more maleimide groups within the molecule thereof, and vinlbenzyl compound (B) obtained by reacting amines with halomethylstyrene in the presence of alkali.

The composition exhibits excellent low-temperature curability, heat resistance and mechanical strength.

5 Claims, No Drawings

CURABLE RESIN COMPOSITION

BCKGROUND OF THE INVENTION

The present invention relates to a curable resin composition. More particularly, the present invention relates to a curable polymaleimide resin composition with excellent low-temperature curability, which provides cured products therefrom with excellent heat resistance and mechanical properties.

As adhesive, casting, impregnating, laminating and molding compounds and the like, curable resins are in wide use for paints, insulating materials, composite structural materials and the like. However, the use and application thereof has recently branched out considerably, so that conventionally known curable resins have not been able to satisfy such needs in some circumstances and conditions of use. Of these, their use especially under high temperatures is not satisfactory, and development in this area has been awaited.

Of conventionally known curable resins, polyimide resins are of one of the most excellent materials, and are under development in various ways. For exampe, Japanese Patent Laid-open No. 53319/1987 discloses a composition with polymaleimide compound and a reactive olygomer having alkenyl ether positioned at its molecular end. However, the resin composition required high temperatures and a long time for curing and when these are included in looking at operability, it still cannot be said that the resin composition is advantageous over existing common curable resins. This can ever be said about conventionally known most representative combinations such as combinations of bismaleimide and aromatic amine and combinations of bismaleimide, aromatic amine and epoxy resin, and materials excellent in heat resistance, mechanical properties, as well as in low-temperature curability have not been provided.

In light of such current circumstances, some of the present inventors carried out a lower curing temperature and shorter curing time, excellent heat resistance and heat stability, and excellent mechanical properties and consequently found that blending the vinylbenzyl ether compound as described in U.S. Pat. No. 4,707,558 with a maleimide compound produces a curable resin composition. That is, they have found and proposed in Japanese Patent Laid-open No. 65110-1989 that a curable resin composition comprising a maleimide compound and vinylbenzyl ether compound bonded to aromatic residues representatively illustrated by bisphenol divinylbenzyl ether can lower curing temperature and greatly reduce curing time as the curing properties. However, the viscosity of this composition is high and improvement has been required.

After further research efforts, the present inventors have found that by the use of the vinylbenzyl compound obtained by reacting amines with halomethylstyrene in the presence of an alkali, a polyimide-type resin composition with a lower operative viscosity and even more superior physical properties can be produced to thus active the present invention.

SUMMARY OF THE INVENTION

The present invention is aimed at providing a curable resin composition comprising a compound (A) having one or more maleimide groups in its molecule and a vinylbenzyl compound (B) obtained by reacting amines with halomethylstyrene in the presence of an alkali.

By composing the present invention as described insofar, curable compositions curable are relatively low temperature and with shorter curing times are possible, such cured products further exhibiting excellent heat stability and mechanical properties with greatly enhanced heat resistance and which can be designed to have low operable viscosity.

DETAILED DESCRIPTION OF THE INVENTION

Each component of the composition of the present invention will now be explained in detail.

(Component A: compound having a maleimide group)

The compound (A) having a maleimide group to be used in the present invention includes N,N'-phenylenebismaleimide, N,N'-xylenebismaleimide, N,N'-trilenebismaleimide, N,N'-diphenylmethane bismaleimide, N,N'-diphenyl ether bismaleimide, N,N'-diphenyl sulfone bismaleimide, N,N'-diphenylmethane bismethylmaleimide, N,N'-diphenyl ether bismethylmaleimide, N,N'-hydrogenated diphenylmethane bismaleimide. Further, there are illustrated amino-modified bismaleimide compound still having maleimide group, obtained by reacting less than 0.3 to 1 mole of a diamino compound such as diaminodiphenylmethane, diaminodiphenyl sulfone, diaminodiphenyl ether with one mole of these bismaleimides; a compound still having a maleimide group as an addition product of amino compound modified with epoxy resin. As a single functional maleimide, there can be mentioned aromatic maleimides representatively illustrated by phenyl maleimide, alkyl maleimides represented by lauryl maleimide and alicyclic maleimides represented by cyclohexyl maleimide.

(Component B: Vinylbenzyl compound)

A vinylbenzyl compound (B) obtained by reacting amines with halomethylstyrene in the presence of an alkali to be used in the present invention is an amine compound having one or more N,N'-vinylbenzyl groups within its molecule and represented by the following general formula (I), or a mixture of an amine compound having one or more N-vinylbenzyl groups within its molecule and represented by the following general formula (I) with divinylbenzyl ether represented by the structural formula (II).

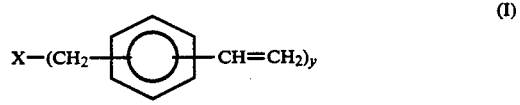
(I)

X in the general formula (I) represents the residue when the "y" hydrogen atoms are removed from the amino group in amines, and y in the general formula (I) is an integer satisfying the formula $1 \leq y \leq 6$.

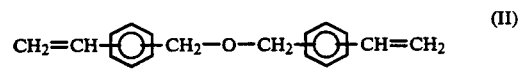
(II)

Amines as the raw material of the vinylbenzyl compound (B) are representatively illustrated by monoamines such as aniline, o-toluidine, m-toluidine, p-toluidine, o-ethylaniline, m-ethylaniline, p-ethylaniline, o-n-propylaniline, p-n-propylaniline, o-isopropylaniline, p-isopropylaniline, o-3-xylidine, o-4-xylidine, m-2-xylidine, m-4-xylidine, m-5-xylidine, p-2-xylidine, pseudocumidine (2,4,5-trimethylaniline), methidine (2,4,6-trimethylaniline), etc.; diamines such as o-phenylenediamine, m-phenylenediamine, p-phenylenediamine, p-aminoacetoanilide, N-methyl-p-phenylenediamine, N-phenyl-p-phenylenediamine, N,N-dimethyl-p-phenylenediamine, N,N'-dimethyl-p-phenylenediamine, 4-aminodiphenylamine, N'-diphenyl-p-phenylenediamine, 2,3-diaminotoluene, 2,4-diaminotoluene, 3,4-diaminotoluene, 2,6-diaminotoluene, 3,5-diaminotoluene, 2,5-diaminotoluene, etc.; polyvalent amines such as 1,2,3-triaminobenzene, 1,2,4-triaminobenzene, 1,3,5-triaminobenzene, etc.; aromatic bisamines such as α-methyl hydrazine, β-methylphenyl hydrazine, α-ethylphenyl hydrazine, β-ethylphenyl hydrazine, 2,4-diaminodiphenylamine, 4,4'-diamino diphenylmethane, 4,4'-diaminodiphenylethane, 4,4'-diaminodiphenylketone, 4,4'-diaminodiphenylether, 4,4'-diamino diphenyl sulfone, etc.; polyamines such as butylamine, isobutylamine, pentylamine, isoamylamine, hexylamine, methylenediamine, ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, heptamethylenediamine, octamethylenediamine, 1,2,3-triaminopropane, tris(2-aminoethyl)amine, tetra(aminomethyl)methane, diethylenetriamine, triethylenetetramine, tetraethylenepentamine, heptaethyleneoctamine, nonaethylenedecamine, bis(3-aminoethyl)amine, diethylaminopropylamine, iminobispropylamine, bis(hexamethylene)triamine, trimethylhexamethylenediamine, diethylene glycol bispropylenediamine, polymethylenediamine, branched polymethylenediamine, polyetherdiamine, 2,5-dimethylhexamethylenediamine, pentaethylenehexamine, aminoethyl ethanolamine, tri(methylamino)hexane, dimethylaminopropylamine, methyliminobispropylamine, amine-terminal polybutadine acrilonitrile (Goodrich Co., Ltd., Hycar, $^R$ATBN), piperazine, N-aminoethylpiperazine, menthenediamine, isophoronediamine, bis(4-amino-3-methyldicyclohexyl)methane, diaminodicyclohexylmethane, bis(aminomethyl)cyclohexane, 3,9-bis(3-aminopropyl)2,4,8,10-tetraoxaspiro(5,5)undecane, 1-[2'-(2''-aminoethylamino)ethyl]piperazine, 1-[2'-(2''-aminoethylamino)ethyl]4-(2'-aminoethyl)piperazine, 1,4-diazacycloheptane, 1,5-diazacyclooctane, 1,9-diazacyclohexadecane, 1,10-diazacyclooctadecane, 1,11-diazacycloeicosane, 1,4,11,14-tetraazacycloeicosane, m-xylylenediamine, p-xylylenediamine, 1,3,5-tris-(aminomethyl)benzene, tetrachloro-p-xylylenediamine, 2-aminoethylbenzene, the polyamine obtained from m-xylylenediamine and epichlorohydrine; aminophenols such as o-aminophenol, m-aminophenol, p-aminophenol, N-methyl-p-aminophenol, 4-oxydiphenylamine, 3-amino-2-oxytoluene, 4-amino-2-oxytoluene, 5-amino-2-oxytoluene, 6-amino-2oxytoluene, 2-amino-3-oxytoluene, 4-amino-3-oxytoluene, 6-amino-3-oxytoluene, 2-amino-4-oxytoluene, 3-amino-4-oxytoluene, 5-amino-3-oxy-o-xylene, 6-amino-3-oxy-o-xylene, 3-amino-4-oxy-o-xylene, 5-amino-4-oxy-o-xylene, 5-amino-2-oxy-m-xylene, 5-amino-4-oxy-m-xylene, 2-amino-5-oxy-m-xylene, 4-amino-5-oxy-m-xylene, 3-amino-2-oxy-p-xylene, 5-amino-2-oxy-p-xylene, 6-amino-2-oxy-p-xylene, 3-aminocatechol, 4-aminocatechol, 3-aminoguaicol, 6-aminoguaicol, 4-aminoguaicol, 5-aminoguaicol, 2-aminoresorcine, 4-aminoresorcine, 5-aminoresorcine, 2-aminohydroquinone, 2,4-diaminophenol, 2,6diaminophenol, 2,5-diaminophenol, 4,5-diaminophenol, 3,4-diaminophenol, 3,5-diaminophenol, 4,6-diaminoresorcine, 2,4,6-triaminophenol, etc.

The vinylbenzyl compound of the component (B) of the present invention can be readily synthesized by the reaction of removing hydrogen chloride between the amines and halomethylstyrene e.g. chloromethylstyrene with caustic potassium and an aqueous solution of caustic sodium using a solvent such as dimethylsulfoxide. A representative synthetic example is shown as follows.

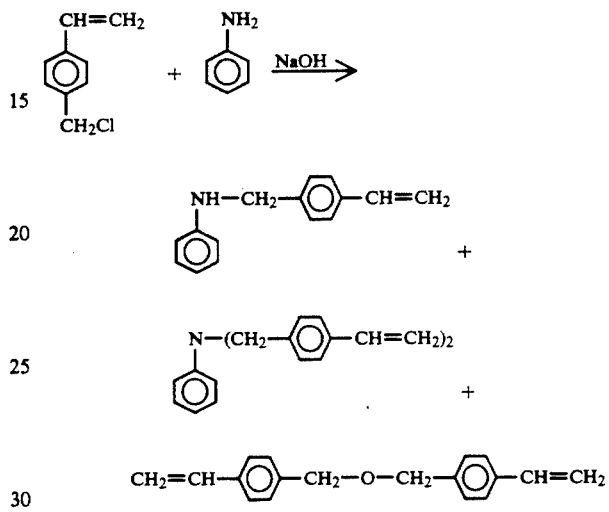

Of the vinylbenzyl compounds obtained by reacting the amines and halomethylstyrene in the presence of an alkali, in accordance with the present invention, the production ratio between the amine compound having one or more N-vinylbenzyl groups and divinylbenzyl ether can be varied by changing the reaction method and the reaction conditions.

First according to the reaction method comprising dropwise addition of chloromethylstyrene in the presence of amine and alkali, the production ratio between the amine compound having one or more N-vinylbenzyl groups and divinylbenzyl can be varied by reacting the amine and chloromethylstyrene at variable ratios between the amine and chloromethylstyrene, with the viscosity simultaneously changed. The equivalent weight ratio between amine and chloromethylenestyrene for reaction, which is calculated on the basis of active hydrogen, is amine/chloromethylstyrene=2.0/1.0–0.01/1.0, preferably 1.0/1.0–0.2/1.0, and the greater chloromethylstyrene there is, the more the production ratio of divinylbenzyl ether becomes, serving to realize a low viscosity.

According to the method of adding dropwise an aqueous alkaline solution in the presence of amine and chloromethylstyrene, the production ratio between an amine compound having one or more N-vinylbenzyl groups and divinylbenzyl ether can be varied by reacting amine with chloromethylstyrene at variable ratios between the amine and chloromethylstyrene, and the viscosity is simultaneously changed. The equivalent weight ratio between amine and chloromethylstyrene for reaction, which is calculated on the basis of active hydrogen, is amine/chloromethylstyrene=2.0/1.0–0.01/1.0, preferably 1.0/1.0–0.2/1.0, and the molecular weight of a product and the production ratio varies depending on the type of amine.

The production ratio between an amine compound having one or more N-vinylbenzyl groups and divinylbenzylether can be effected by the reaction temperature, and the velocity of adding dropwise chloromethylstyrene and the alkali.

In the composition of the present invention, the component ratio between the compound (A) having one or more maleimide groups within its molecule and the vinylbenzyl compound (B) obtained by reacting amines with halomethylstyrene in the presence of an alkali may be changeable in a wide range, depending on the object of the use thereof, and the equivalent weight ratio represented in unsaturated groups is A/B = 100/30–1/100, more preferably 100/50–1/30. Within such range, the composition easily thermosets without intentionally adding a radical initiator required for the curing, and the reaction progresses at a far lower temperature and a much shorter time, compared with thermosetting with each of the components. In such range, the temperature where the ambient heat degradation thereof is initiated is high, and the decrease in weight by degradation is small.

In the curable composition of the present invention, other known monomers e.g. styrene, vinyltoluene, allylphenol, allyloxybenzene, diallylphthalate, acrylic acid ester, methacrylic acid ester, vinylpyrrolidone, etc. may be blended in addition to the components (A) and (B), within the scope of the present invention, and if there are blended known radical initiators such as organic peroxides or organic peroxides along with a promoter for their degradation (Redox reaction reagent), curing is possible in a wide temperature range from ambient temperatures to high temperatures for a short time. Needless to say compounds commonly used and known for adjusting curing, such as hydroquinone, benzoquinone, copper salt, tetramethylthiuram compounds, nitrosophenyl hydroxyradical compounds, etc., may be used and radical initiators may be blended in order to promote curing.

The curable composition of the present invention can be made into molding materials and composite materials by reblending other various fillers and reinforcing fibers with a kneader, a blender, a roller, etc., or into varnish, paints, and adhesives in the state where they are dissolved into solvents, or into a prepreg by being impregnated in reinforcing fiber such as glass fiber, carbon fiber, aromatic polyamide fiber, silicone carbide fiber and alumina fiber, or into molding materials and structural materials useful as filament winding.

Although reference Examples and Examples are shown below so as to explain the present invention in detail, they are not intended to limit the scope of the present invention. Unless otherwise specified. The term part in the Examples represents part by weight.

REFERENCE EXAMPLE 1

[Synthesis of vinylbenzyl compound, obtained by the reaction between aniline (1.0 equivalent weight) and chloromethylstyrene 1.0 equivalent weight]

Forty-six point six (46.6) parts of aniline (1.0 equivalent weight) were dissolved in 100 parts of dimethylsulfoxide, to which was added an aqueous potassium hydroxide solution (potassium hydroxide 56.1 parts (1.0 equivalent weight), water 35 parts). To the resulting solution were added dropwise, at 60°±2° C. for 40 minutes, 152.5 (1.0 equivalent weight) parts of commercially available chloromethylstyrene with 300 ppm of N-nitrosophenylhydroxylamine in aluminum salt (Q-1301) being added, which was diluted in advance with 50 parts of DMSO, and further reacted at 60°±2° C. for 4 hours.

Into the system was added a greatly excessive amount of water for agitation, and water and dimethylsulfoxide were then removed to extract oils with benzene. The benzene phase was repeatedly washed with water until the pH in the aqueous phase reached 7, and the benzene was removed under reduced pressure to produce a reaction product as oils (abbreviated as N-DVBA hereinafter) at a yield of 99%.

The viscosity of the reaction product was as low as 35 CPS/25° C., with the content of divinylbenzyl ether being 28% from calculation based on GPC, and the reaction product could be dissolved in various organic solvents such as benzene, toluene, acetone, etc.

REFERENCE EXAMPLE 2

[Synthesis of vinylbenzyl compound obtained by the reaction between 4,4'-diaminodiphenylmethane (1.0 equivalent weight) and chloromethylstyrene (1.0 equivalent weight)]

Forty-nine point five (49.5) parts of 4,4'-diaminodiphenylmethane (1.0 equivalent weight) were dissolved in 150 parts of dimethylsulfoxide, to which was added an aqueous potassium hydroxide solution (potassium hydroxide 56.1 parts (1.0 equivalent weight), water 35 parts). To the resulting solution were added dropwise, at 60°±2° C. for 40 minutes, 152.5 parts of commercially available chloromethylstyrene (1.0 equivalent weight) with 300 ppm of N-nitrosophenylhydroxylamine in aluminum salt (Q-1301) being added, which was diluted in advance with 50 parts of DMSO, and further reacted at 60°±2° C. for 4 hours.

Into the system was added a greatly excessive amount of water for agitation, and water and dimethylsulfoxide were then removed to extract oils with benzene. The benzene phase was repeatedly washed with water until the pH in the aqueous phase reached 7, and the benzene was removed under reduced pressure to produce a reaction product as oils between 4,4'-diaminodiphenylmethane (1.0 equivalent weight) and chloromethylstyrene (1.0 equivalent weight) (abbreviated as N-TVBDDM hereinafter) at a yield of 99%.

The viscosity of the reaction product was 2600 CPS/25° C., with the content of divinylbenzyl ether being 17%, from calculation based on GPC, and the reaction product could be dissolved in various organic solvents such as benzene, toluene, acetone, etc.

REFERENCE EXAMPLE 3

[Synthesis of vinylbenzyl compound, obtained by the reaction between 4,4'-diaminodiphenylmethane (1.0 equivalent weight) and chloromethylstyrene (1.5 equivalent weight)]

Forty-nine point five (49.5) parts of 4,4'-diaminodiphenylmethane (1.0 equivalent weight) were dissolved in 150 parts of dimethylsulfoxide, to which was added an aqueous potassium hydroxide solution (potassium hydroxide 84.2 parts (1.5 equivalent weight), water 50 parts). To the resulting solution were added dropwise, at 60°±2° C. for 40 minutes, 228.8 parts of commercially available chloromethylstyrene (1.5 equivalent weight) with 300 ppm of N-nitrosophenylhydroxylamine in aluminium salt (Q-1301) being added, which was diluted in advance with 75 parts of DMSO, and further reacted at 60°±2° C. for 4 hours.

Into the system was added a greatly excessive amount of water for agitation, and water and dimethylsulfoxide were then removed to extract oils with benzene. The benzene phase was repeatedly washed with water until the pH in the aqueous phase reached 7, and the benzene was removed under reduced pressure to produce a reaction product between 4,4'-diaminodiphenylmethane (1.0 equivalent weight) and chloromethylstyrene (1.5 equivalent weight) (abbreviated as 1.5N-TVBDDM) at a yield of 99%.

The viscosity of the reaction product was 330 CPS/25° C., with the content of divinylbenzyl ether being 28%, from calculation based on GPC, and the reaction product could be dissolved in various organic solvents such as benzene, toluene, acetone, etc.

REFERENCE EXAMPLE 4

[Synthesis of vinylbenzyl compound, obtained by the reaction between ethylenediamine (1.0 equivalent weight) and chloromethylstyrene (1.0 equivalent weight)]

Fifteen (15) parts of ethylenediamine (anhydrous) (1.0 equivalent weight) were dissolved in 150 parts of dimethylsulfoxide, to which were added dropwise 152.5 parts of commercially available chloromethylstyrene (1.0 equivalent weight) with 300 ppm of Q-1301 being added, and was further added an aqueous potassium hydroxide solution (potassium hydroxide 56.1 parts and water 40 parts), at 60°±2° C. for 40 minutes, and further reacted at 60°±2° C. for 4 hours.

Into the system was added a greatly excessive amount of water for agitation, and water and dimethylsulfoxide were then removed to extract oils with benzene. The benzene phase was repeatedly washed with water until the pH in the aqueous phase reached 7, and the benzene was removed under reduced pressure to produce a reaction product as oils between ethylenediamine (1.0 equivalent weight) and chloromethylstyrene (1.0 equivalent weight) (abbreviated as N-TVBEDA) at a yield of 98%.

The viscosity of the reaction product was 3250 CPS/25° C., and it could be dissolved in various organic solvents such as benzene, acetone, toluene, etc., and the content of divinylbenzyl ether in the product was 0 wt %, which was calculated based on GPC.

Following the same method as in Reference Example 4, a reaction product (abbreviated as N-DVBP; viscosity, 930 cps/25° C; divinylbenzyl ether content, 0 wt %, from calculation based on GPC) was synthesized by using piperazine (1.0 equivalent weight) instead of ethylene diamine (1.0 equivalent weight).

REFERENCE EXAMPLE 5

[Synthesis of diaminodiphenylmethane-modified bismaleimide obtained by the reaction between bismaleimide and diaminodiphenylmethane]

Three-hundred fifty-eight (358) parts of N,N'-diphenylmethane bismaleimide (1.0 mole) and 99 parts of diaminodiphenylmethane (0.5 mole) were thoroughly ground and mixed well in a ball mill. The resulting mixture was melted and agitated in a vessel at 170° C. for 10 minutes, which vessel was immediately cooled with water to produce a solid. The reaction product could be dissolved in a solvent such as N-methylpyrrolidone, dimethylformamide, etc. and could be dissolved in a solvent with a low boiling point, such as acetone, methylethylketone, etc. (abbreviated as DDM-modified BMI).

EXAMPLE 1

One hundred parts of each of the reaction products synthesized in Reference Examples 1-4, i.e. N-DVBA, N-TBVDDM, 1.5N-TVBDDM, N-TVBEDA and N-DVBP, were mixed with 100 parts of diphenylmethane bismaleimide (abbreviated as BMI hereinbelow) manufactured by Chiba Geigy Co., Ltd. to prepare samples. The samples were placed on hot plates at 120° C. to examine their gellation. For comparison, vinylbenzyl compounds and BMI were also tested and the results are summarized in Table

TABLE 1

|  |  | Time for gelation (min) (120° C.) |
|---|---|---|
| N-DVBA/BMI |  | 2.1 |
| N-TBVDDM/BMI |  | 2.1 |
| 1.5 N-TBVDDM/BMI |  | 2.2 |
| N-TVBEDA/BMI |  | 1.9 |
| N-DVBP-BMI |  | 2.0 |
| (Comparison) |  |  |
| BMI | Single | >60 |
| N-DVBA | Single | >60 |
| N-TVBDDM | Single | >60 |
| 1.5 N-TVBDDM | Single | >60 |
| N-TVBEDA | Single | >60 |
| N-DVBP | Single | >60 |

Each composition was molded at 120° C. for 30 minutes, and after removal from the mold, they were subsequently post-cured at 250° C. for 5 hours. The heat degradation initiating temperature of the resulting cured product and the heat deformation temperature (HDT) thereof according to JIS K6911 were measured. The results are shown in Table 2.

TABLE 2

|  | Heat deformation temperature | Heat degradation initiation temperature* |
|---|---|---|
| N-DVBA/BMI | >300° C. | 403° C. |
| N-TBVDDM/BMI | >300° C. | 407° C. |
| 15 N-TBVDDM/BMI | >300° C. | 405° C. |
| N-TVBEDA/BMI | >300° C. | 408° C. |
| N-DVBP/BMI | >300° C. | 403° C. |

*Temperature at 5% reduction in weight at 20° C./min of temperature-increasing rate.

EXAMPLE 2

The sample of one equivalent weight by theoretical equivalent weight of each of the reaction products synthesized in Reference Examples 1-4, ie. N-DVBA, N-TVBDDM, 1.5 N-TVBDDM, N-TVBEDA and N-DVPB, mixed wth one equivalent weight of diphenylmethane bismaleimide (abbreviated as BMI) manufactured by Chiba Geigy Co., Ltd and one equivalent weight by theoretical equivalent weight of DDM-modified BMI synthesized in Reference Example 5 was molded at 120° C. for 30 minutes, which was then removed from the mold. Subsequently the product was post-cured at 250° C. for 5 hours, and the flexural strength and flexural modulus of the resulting casting boards at room temperature and during heating were measured according to the JIS 6911 method, and the results are shown in Table 3.

TABLE 3

| | Example | | | | | | | | |
|---|---|---|---|---|---|---|---|---|---|
| | N-DVBA | | N-TVBDDM | | | N-TVBEDA | | N-DVBP | |
| | BMI | DDM-MODIFIED BMI | BMI | DDM-MODIFIED BMI | 1.5 N-TVBDDM BMI | BMI | DDM-MODIFIED BMI | BMI | DDM-MODIFIED BMI |
| (23° C.) | | | | | | | | | |
| Flexural strength (kg/mm$^2$) | 11.6 | 12.1 | 10.7 | 11.4 | 10.5 | 10.2 | 11.5 | 10.4 | 10.9 |
| Flexural modulus (kg/mm$^2$) | 433 | 422 | 404 | 428 | 415 | 467 | 434 | 407 | 402 |
| (200° C.) | | | | | | | | | |
| Flexural strength (kg/mm$^2$) | 8.6 | 7.9 | 9.9 | 9.5 | 9.7 | 7.6 | 8.2 | 8.1 | 8.3 |
| (retention rate %) | (74) | (65) | (93) | (83) | (92) | (75) | (71) | (78) | (76) |
| Flexural modulus (kg/mm$^2$) | 348 | 298 | 335 | 311 | 360 | 358 | 292 | 297 | 266 |
| (retention rate %) | (80) | (67) | (83) | (73) | (87) | (77) | (67) | (73) | (66) |
| (250° C.) | | | | | | | | | |
| Flexural strength (kg/mm$^2$) | 8.2 | 7.0 | 8.9 | 7.8 | 8.7 | 8.2 | 7.4 | 6.8 | 6.1 |
| (retention rate %) | (71) | (57) | (83) | (68) | (83) | (80) | (64) | (65) | (56) |
| Flexural modulus (kg/mm$^2$) | 302 | 252 | 314 | 284 | 323 | 319 | 261 | 236 | 201 |
| (retention rate %) | (70) | (57) | (78) | (66) | (78) | (68) | (60) | (58) | (50) |
| (270° C.) | | | | | | | | | |
| Flexural strength (kg/mm$^2$) | 7.4 | 5.1 | 7.6 | 6.0 | 7.4 | 6.3 | 5.0 | 4.8 | 3.9 |
| (retention rate %) | (64) | (42) | (71) | (53) | (69) | (62) | (43) | (46) | (36) |
| Flexural modulus (kg/mm$^2$) | 256 | 179 | 283 | 209 | 295 | 266 | 215 | 185 | 135 |
| (retention rate %) | (59) | (40) | (73) | (49) | (71) | (57) | (50) | (45) | (34) |

EXAMPLE 3

One hundred (100) parts of the reaction product (abbreviated as N-DVBA) obtained in Reference Example 1 and 100 parts of diphenylmethane bismaleimide manufactured by Chiba Geigy Co., Ltd. were mixed with 200 parts of acetone into a solution of a viscosity of 0.6 poise/25° C.

After the resin solution was impregnated into carbon cloth of 200 g/m$^2$ (#6343 Toray Co., Ltd.), the solution was dried at 120° C. for 6 min for carrying out stage B, to obtain a prepreg of 320 g/m$^2$ with a slight viscosity. The volatile component of the prepreg (calculated from the difference in weight after heat treatment at 150° C. for 20 minutes) was 0.2% to 0.4%.

Sixteen plies of the prepreg were then layered to carry out molding under heating and pressure (40 kg/cm$^2$) at 150° C. for 15 minutes, followed by removal from the mold, and the product was subsequently post-cured at 200° C. for 5 hours and followed by post-curing at 250° C. for 5 hours, which was taken as a testing sample.

No microcracks are observed in this sample by microscopic observation under 20 magnification. The flexural strength and flexural modulus of the sample were measured at room temperature and during heating according to JIS K-6911, and the results are shown in Table 4. The flexural strength and flexural modulus of the sample at 23° C. after ageing at 250° C. for 1500 hours are shown in Table 5.

EXAMPLE 4

One hundred (100) parts of the reaction product (abbreviated as N-TVBDDM) obtained in Reference Example 2, 50 parts of diphenylmethane bismaleimide manufactured by Chiba Geigy Co., Ltd., and 10 parts of phenylmaleimide were mixed with 200 parts of acetone into a solution o f a visocity of 0.5 poise/25° C.

After the resin solution was impregnated into carbon cloth of 200 g/m$^2$ (#6343 Toray Co., Ltd.), the soultion was dried at 120° C. for 6 min for carrying out stage B, to obtain a prepreg of 300 g/m$^2$ with a slight viscosity. The volatile component of the prepreg (calculated from the difference in weight after heat treatment at 150° C. for 20 minutes) was 0.2% to 0.4%.

Sixteen plies of the prepreg were then layered to carry out molding under heating and pressure (40 kg/cm$^2$) at 150° C. for 15 minutes, followed by removal from the mold, and the product was subsequently post-cured at 200° C. for 5 hours and continuously at 250° C. for 5 hours, which was taken as a testing sample.

No microcracks were observed in this sample by microscopic observation under 20 magnification. The flexural strength and flexural modulus of the sample were measured at room temperature and during heating according to JIS K-6911, and the results are shown in Table 4. The flexural strength and flexural modulus of the sample at 23° C. after ageing at 250° C. for 1500 hours are shown in Table 5.

EXAMPLE 5

One hundred (100) parts of the reaction product (abbreviated as 1.5N-TVBDDM) obtained in Reference Example 3 and 70 parts of DDM-modified BMI synthesized in Reference Example 5 were mixed with 200 parts of acetone into a solution of a viscosity of 0.6 poise/25° C.

After the resin solution was impregnated into carbon cloth of 200 g/m$^2$ (#6343 Toray Co., Ltd.), the solution was dried at 120° C. for 6 min for carrying out stage B, to obtain a aprepreg of 330 g/m$^2$ with a slight viscosity. The volatile component of the prepreg (calculated from the difference in weight after heat treatment at 150° C. for 20 minutes) was 0.2% to 0.4%.

Sixteen plies of the prepreg were then layered to carry out molding under heating and pressure (40 kg/cm$^2$) at 150° C. for 30 minutes, followed by removal from the mold, and the product was subsequently postcured at 200° C. for 5 hours and continuously at 250° C. for 5 hours, which was taken as a testing sample.

No microcracks were observed in this sample by microscopic observation under 20 magnification. The flexural strength and flexural modulus of the sample were measured at room temperature and during heating according to JIS K-6911, and the results are shown in Table 4. The flexural strength and flexural modulus of the sample at 23° C. after ageing at 250° C. for 1500 hours are shown in Table 5.

EXAMPLE 6

One hundred (100) parts of the reaction product (abbreviated as N-TVBEDA) obtained in Reference Example 4 and 100 parts of diphenylmethane bismaleimide manufactured by Chiba Geigy Co., Ltd. were mixed with 200 parts of acetone into a solution of a viscosity of 1.2 poise/25° C.

After the resin solution was impregnated into carbon cloth of 200 g/m$^2$ (#6343 To-Ray Co., Ltd.), the solution was dried at 120° C. for 6 min for carrying out stage B, to obtain a prepreg of 300 g/m$^2$ with a slight viscosity. The volatile component of the prepreg (calculated from the difference in weight after heat treatment at 150° C. for 20 minutes) was 0.2% to 0.4%.

Sixteen plies of the prepreg were then layered to carry out molding under heating and pressure (40 kg/cm$^2$) at 150° C. for 15 minutes, followed by removal from the mold, and the product was subsequently postcured at 200° C. for 5 hours and continuously at 250° C. for 5 hours, which was taken as a testing sample.

No microcracks were observed in this sample by microscopic observation under 20 magnification. The flexural strength and flexural modulus of the sample were measured at room temperature and during heating according to JIS K-6911, and the results are shown in Table 4. The flexural strength and flexural modulus of the sample at 23° C. after ageing at 250° C. for 1500 hours are shown in Table 5.

Comparative Example 1

After 100 parts o f Compimide 183 (amide-modifed bismaleimide) manufacured by Shell Chemical Company, Co., Ltd. and 0.1 part of 2-methylimidazola were dissolved in 100 parts of dimethylformamide, the resulting resin solution was impregnated into carbon cloth of 200 g/m$^2$ (#6343 Toray Co., Ltd.,), which was then dried at room temperature for one day and subsequently at 120° C. for 15 min, to obtain a nonviscous prepreg of 270 g/m$^2$.

The volatile component of the prepreg (calculated from the difference in weight after heat treatment at 170° C. for 20 minutes) was 3% to 5%.

Sixteen plies of the prepreg were then layered to carry out molding under heating and pressure (40 kg/cm$^2$) at 180° C. for 2 hours, followed by removal from the mold, and the product was subsequently postcured at 210° C. for 5 hours and continuously at 250° C. for 5 hours, which was taken as a testing sample.

No microcracks were observed in this sample by microscopic observation under 20 magnification. The flexural strength and flexural modulus of the sample were measured at room temperature and during heating according to JIS K-6911, and the results are shown in Tablw 4. The flexural strength and flexural modulus of the sample at 23° C. after ageing at 250° C. for 1500 hours are shown in Table 5.

Comparative Example 2

After 100 parts of Kerimid 601 (amine-modified bismaleimide manufactured by Mitsui Chemicals, Co., Ltd. were dissolved in 120 parts of dimethylformamide, the resulting resin solution was impregnated into carbon cloth of 200 g/m$^2$ (#6343 Toray, Co., Ltd.), which was then dried at room temperature for one day and subsequently at 150° C. for 10 min, to obtain a nonviscous prepreg of 300 g/m$^2$.

Sixteen plies of the prepreg were then layered to carry out molding under heating and pressure (40 kg/cm$^2$) at 180° C. for 2 hours, folowed by removal from the mold, and the product was subsequently postcurved at 200° C. for 4 hours and continuously at 250° C. for 8 hours, which was taken as a testing sample.

No microcracks were observed in this sample by microscopic observation under 20 magnification. The flexural strength and flexural modulus of the sample were measured at room temperature and during heating according to JIS K-6911, and the results are shown in Tablw 4. The flexural strength and flexural modulus of the sample at 23° C. after ageing at 250° C. for 1500 hours are shown in Table 5.

Comparative Example 3

After 100 parts of tetrafunctional glycidyl amine-type epoxy resin (manufacutred by Chiba Geigy, Co., Ltd., MY-721) and 52 parts of diaminodiphenyl sulfone (DDB) were dissolved in 150 parts of acetone, the resulting resin solution was impregnated into carbon cloth of 200 g/m$^2$ (#6343 Toray Co., Ltd.), which was then dried for 5 minutes for carrying out stage B, to obtain a prepreg of 270 g/m$^2$ with a slight viscosity. The volatile component of the prepreg (calculated from the difference in weight at heat treatment at 150° C. for 20 minutes) was 0.2–0.4%.

Sixteen plies of the prepreg were then layered to carry out molding under heating and pressure (40 kg/cm$^2$) at 175° C. for 90 minutes, followed by removal from the mold, and the product was subsequently postcured at 200° C. for 5 hours and continuously at 250° C. for 5 hours, which was taken as a testing sample.

No microcracks were observed in this sample by microscopic observation under 20 magnification. The flexural strength and flexural modulus of the sample were measured at room temperature and during heating according to JIS K-6911, and the results are shown in Table 4. The flexural strength and flexural modulus of the sample at 23° C. after ageing at 250° C. for 1500 hours are shown in Table 5.

TABLE 4

| | Exam. 3 | Exam. 4 | Exam. 5 | Exam. 6 | Com. 1 | Com. 2 | Com. 3 |
| --- | --- | --- | --- | --- | --- | --- | --- |
| Content of carbon cloth (wt %) | 61 | 61 | 62 | 63 | 65 | 66 | 64 |
| Heat degradation* initiating temp. (°C.) (23° C.) | 429 | 445 | 410 | 423 | 428 | 400 | 392 |

TABLE 4-continued

|  | Exam. 3 | Exam. 4 | Exam. 5 | Exam. 6 | Com. 1 | Com. 2 | Com. 3 |
| --- | --- | --- | --- | --- | --- | --- | --- |
| Flexural strength (kg/mm$^2$) | 63 | 66 | 65 | 62 | 61 | 73 | 76 |
| Flexural modulus (kg/mm$^2$) | 6100 | 6150 | 6210 | 6140 | 6350 | 6450 | 6060 |
| (200° C.) | | | | | | | |
| Flexural strength (kg/mm$^2$) | 69 | 79 | 68 | 63 | 55 | 66 | 66 |
| (retention rate %) | (110) | (120) | (105) | (102) | (90) | (90) | (87) |
| Flexural modulus (kg/mm$^2$) | 6280 | 6640 | 6270 | 6450 | 6410 | 6580 | 5820 |
| (retention rate %) | (103) | (108) | (101) | (105) | (101) | (102) | (96) |
| (250° C.) | | | | | | | |
| Flexural strength (kg/mm$^2$) | 65 | 76 | 65 | 57 | 53 | 48 | 60 |
| (retention rate %) | (104) | (115) | (100) | (92) | (87) | (66) | (79) |
| Flexural modulus (kg/mm$^2$) | 6160 | 6460 | 6270 | 5890 | 6410 | 5800 | 5820 |
| (retention rate %) | (101) | (105) | (101) | (96) | (101) | (90) | (96) |
| (270° C.) | | | | | | | |
| Flexural strength (kg/mm$^2$) | 62 | 66 | 64 | 56 | 43 | 20 | 22 |
| (retention rate %) | (98) | (100) | (98) | (90) | (70) | (27) | (29) |
| Flexural modulus (kg/mm$^2$) | 6155 | 6030 | 5900 | 5770 | 5330 | 3290 | 3390 |
| (retention rate %) | (101) | (98) | (95) | (94) | (84) | (51) | (56) |

*Temperature at 5% reduction in weight at 20° C./min. of temperature-increasing rate.

TABLE 5

|  | Exam. 3 | Exam. 4 | Exam. 5 | Exam. 6 | Com. 1 | Com. 2 | Com. 3 |
| --- | --- | --- | --- | --- | --- | --- | --- |
| (23° C.) | | | | | | | |
| Flexural strength (kg/mm$^2$) | 63 | 66 | 65 | 62 | 61 | 73 | 76 |
| Flexural modulus (kg/mm$^2$) | 6100 | 6150 | 6210 | 6140 | 6350 | 6450 | 6060 |
| (after 1500 hr aging at 250° C.) | | | | | | | |
| Flexural strength (kg/mm$^2$) | 42 | 46 | 47 | 38 | 23 | 34 | 3 |
| (retention rate %) | (67) | (70) | (72) | (61) | (38) | (47) | (4) |
| Flexural modulus (kg/mm$^2$) | 5860 | 5900 | 5840 | 5830 | 4760 | 5800 | 1620 |
| (retention rate %) | (96) | (96) | (94) | (95) | (75) | (90) | (27) |

EXAMPLE 7

Thirty (30) parts of phenylmaleimide were placed in a flask, melted and agitated at 140° C., to which were added 70 parts of diphenylmethane bismaleimide manufactured by Chiba Geigy Co., Ltd. The temperature was further increased up to 180° C., followed by continuous agitation for 5 minutes for thorough solubilization, and the resulting mixture was rapidly cooled to obtain a eutectic mixture between phenylmaleimide and diphenylmethane bismaleimide. The eutetic mixture was dissolved to a concentration more than 30%, in low-boiling-point solvents such as dioxane, methylethylketone, acetone, etc., as well as dimethylformamide and N-methylpyrrolidone.

After the eutetic mixture and each of the reaction products obtained in Synthetic Examples 1-3 were heated at 50° C-60° C. and agitated for 5 minutes, followed by cooling to ambient temperature, a homogeneous liquid with a low viscosity was obtained.

EXAMPLE 8 (Example of pultrusion)

One hundred (100) parts of the reaction product in Reference Example 1, obtained by reacting aniline with chloromethylstyrene in the presence of alkali, and 67 parts of the eutectic compound of phenylmaleimide and diphenylmethane bismaleimide were agitated at 50° C. for minutes and cooled. To the resulting solution were added 2.0 parts of zinc stearate as remover and 1.7 parts of tert-butylperbenzoate as curing agent, which was agitated to obtain a homogeneous resin solution of 7 poise/ 25° C.

The resin solution was impregnated in 10 glass rovings (4.45 g/m), and was then subjected to the pultrusion with a rod of a 6-mm diameter (see the molding condition hereinbelow), followed by post-curing at 250° C. for 5 hours, to obtain a dark-brown, uniaxial, glass-fiber-reinforced heat resistant rod (62 glass vol%). The heat-degradation initiating temperature of the rod was 410° C. (Temperature at 5% reduction in weight at a temperature-increasing rate of 20° C./min.)

| Molding conditions | |
| --- | --- |
| Mold | 70 cm in length |
| Mold temperature | 160° C. at central portion |
| Speed of pultrusion | 50 cm/min |

EXAMPLE 9 (Examples of filament winding)

One hundred (100) parts of the reaction product (1.5N-TVBDDM) in Reference Example 3, obtained by reacting 4,4-diaminodiphenylmethane (1.0 equivalent weight) with chloromethylstyrene (1.5 equivalent weight) in the presence of alkali, and 67 parts of the eutectic compound of phenylmaleimide and diphenylmethane bismaleimide were agitated at 50° C. for 5 minutes after addition of 50 ppm of hydroquinone as a stabilizer, followed by cooling. To the resulting soultion were added 0.9 part of cobalt naphtenate (C 6%) as curing promotor and 328 E (Kayaku Axzo K.K) as curing agent for agitation, to obtain a homogeneous resin solution of 12 poise/25° C. (gelling time of 40 min/25° C).

The resin solution was used to be impregnated in glass rovings (SX-220PE. 985ES/Nitto Boseki K.K), which were prepared in one direction in plane mandrel for filament winding, cured at room temperature (60 min/room temperature) before removal from the mold, which were then post-cured at 250° C. for 5 hours to be taken as testing sample. The flexural strength and flexural modulus were measured at room temperature and during heating according to JIS K-6911, and the results are shown in Table 6.

TABLE 6

| Content of glass fiber (wt %) | Example 9 Uniaxial glass 60 |
| --- | --- |
| 23° C. Flexural strength (kg/mm²) | 83 |
| Flexural modulus (kg/mm²) | 2850 |
| 200° C. Flexural strength (kg/mm²) | 79 |
| (retention rate %) | (95) |
| Flexural modulus (kg/mm²) | 2990 |
| (retention rate %) | 105 |
| 250° C. Flexural strength (kg/mm²) | 75 |
| (retention rate %) | (90) |
| Flexural modulus (kg/mm²) | 2860 |
| (retention rate %) | (100) |
| 270° C. Flexural strength (kg/mm²) | 73 |
| (retention rate %) | (88) |
| Flexural modulus (kg/mm²) | 2760 |
| (retention rate %) | (97) |

The curable resin composition of the present invention shows good operability due to its low viscosity, and exhibits excellent low-temperature curability, heat resistance and mechanical properties, so the composition can be used widely in industry, as adhesive, casting, coating, impregnation and laminating mold compounds, or as paints, insulating materials or composite structural materials.

What is claimed is:

1. Curable resin composition comprising a compound (A) having one or more maleimide groups within the molecule therefore, and vinylbenzene compound (B) obtained by reacting amines with halomethylstyrene in the presence of an alkali, wherein vinylbenzene compound (B) obtained by reacting amines with halomethylstyrene in the presence of an alkali is an amine compound having one or more N-vinylbenzyl groups within its molecule and represented by the following formula (I)

wherein x represents the residue when y hydrogen atoms are removed from the amine group in amines and y satisfies the formula $1 \leq y \leq 6$, or a mixture of an amine compound having one or more N-vinylbenzyl groups within its molecule and represented by the formula (I), above, with divinylbenzyl ether represented by the following formula (II)

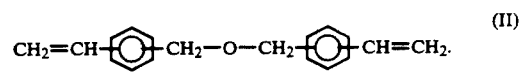

2. The curable resin composition of claim 1, wherein the vinybenzyl compound (B) is a reaction product obtained by reacting amines and chloromethylstyrene in the presence of an alkali.

3. The composition of claim 1, wherein the unsaturated equivalent weight ratio between components (A) and (B) is A/B = 100/30-1/00.

4. The composition of claim 3, wherein the unsaturated equivalent weight ratio between components (A) and (B) is A/B = 100/50-1/30.

5. The composition of any one of claims 1 to 4, wherein besides the components (A) and (B) known monomers capable of copolymerizing the components (A) and (B) are added.

* * * * *